Patented May 17, 1938

2,117,349

UNITED STATES PATENT OFFICE 2,117,349

ESTERS OF ACRYLIC ACID

Harry T. Neher, Bristol, Pa., assignor to Röhm & Haas Company, Philadelphia, Pa.

No Drawing. Application March 12, 1936, Serial No. 68,485

3 Claims. (Cl. 260—2)

This invention relates to new esters of acrylic acid and to products which may be obtained from them by subjecting them to polymerizing influences. It resides in the discovery that the acrylic acid esters of secondary or tertiary alcohols form polymers which are considerably harder than the polymers of acrylates, the alcohol radical of which is obtained from a normal primary alcohol. It is known that acrylic esters of the latter type increase in softness as the number of carbon atoms in the alcohol radical increases.

It is an object of this invention to provide aliphatic esters of acrylic acid which form polymers having a greater degree of hardness than any of those now known. This object has been accomplished by my discovery that the esters of acrylic acid and secondary and tertiary amyl and butyl alcohols yield polymers which are very hard and thus useful for a number of purposes for which the esters of normal primary alcohols were unsuited.

The polymerized esters obtained from acrylic acid and the tertiary alcohols are harder than those obtained from the secondary alcohols and polymeric tertiary butyl acrylate is the hardest of all polymers of aliphatic acrylic acid esters.

This invention includes the monomeric and also the polymeric form of the esters obtained from acrylic acid and the following alcohols:— Secondary butyl alcohol, tertiary butyl alcohol, methyl propyl carbinol, diethyl carbinol, methyl isopropyl carbinol, and tertiary amyl alcohol.

These esters may be prepared in various known ways as for example by reaction of acrylic acid and the alcohol in the presence of dehydrating agents by the action of the acid chloride on the alcohol according to the process of the Bauer Patent No. 1,951,782 or by the action of acrylic anhydride on the alcohol. The reaction of the acid chloride on the alcohol is preferred on account of the well known tendency of secondary and tertiary alcohols to dehydrate and form olefines in the presence of strong dehydrating agents.

The esters may be polymerized by any of the known methods such as by heat, or irradiation, or both. Polymerization catalysts may be used, if desired, such as organic and inorganic peroxides, oxygen, ozone, etc. The polymerization may be carried out on the monomeric material alone or the monomer may be dissolved in a suitable solvent. In some cases the solvent may not be a solvent for the polymeric form in which case the polymer may be obtained in the form of a powder suitable for molding. The esters may also be suspended in a non-solvent such as water with or without emulsifying agents and subjected to polymerizing influences. In this case also the polymer may be obtained in the form of a powder.

The following examples will illustrate the invention. It is to be understood, however, that other methods of preparation and polymerization may be employed.

Example 1

One mol. of acrylyl chloride, one mol. of butanol-2 and 1.1 mol. of calcium carbonate were mixed and stirred at 70° C. for one hour, allowed to stand overnight and filtered. The filtrate was washed with sodium bicarbonate, dried and fractionated. The secondary butyl acrylate obtained is a colorless liquid boiling at 131–132.5° C. at 765 mm. pressure. It has a refractive index of $n_D 23°$ 1.413 and a density of 0.907 at 20° C.

When the ester was heated with 0.05% benzoyl peroxide at 100° C. for 24 hours, it polymerized to a clear, colorless, transparent mass, materially harder and not so tacky as is the normal butyl acrylate polymer.

Example 2

Tertiary butyl acrylate was prepared by the method given in Example 1. It is a colorless liquid boiling at 117–120° C. at 759 mm. pressure, having a refractive index of $n_D 23°$ 1.409 and a density of 0.885 at 20° C. The ester is quite resistant to hydrolysis by alkali but is hydrolyzed by acid. On polymerization it gives a clear, colorless, transparent, hard, tough, somewhat brittle mass that appears to be the hardest of the aliphatic acrylate polymers.

Example 3

Secondary amyl acrylate was prepared by substituting pentanol-2 for secondary butyl alcohol in Example 1. It is a colorless liquid boiling at 71–72° C. at 37 mm. pressure. Its refractive index is $n_D 24°$ 1.417; its density is 0.892 at 20° C. On polymerization it gives a product resembling polymeric secondary butyl acrylate though slightly softer and somewhat stickier.

Example 4

Tertiary amyl acrylate was prepared by the method of Example 1. It is a colorless liquid boiling at 65–68° C. at 49 mm. pressure, having a refractive index of $n_D 24°$ 1.419 and a density of 0.919 at 20° C. On polymerization it gives a product closely resembling polymerized tertiary butyl acrylate, but somewhat less brittle. It is the hardest and toughest of the isomeric amyl acrylates.

The monomeric materials may also be mixed with other monomeric polymerizable unsaturated compounds and subjected to polymering influences for the purpose of preparing joint polymers of varying properties. Such other polymerizable compounds include other esters of acrylic acid, esters of methacrylic acid, vinyl esters, ethers and ketones, the halides, amides, anhydrides and nitriles of acrylic and methacrylic acid, isoprene, butadien, styrene, etc.

The products of polymerization of these esters are useful for many purposes. They may be molded, machine-turned, extruded or otherwise formed into various useful articles. They may be used for adhesives, electrical insulators, intermediate layers in laminated glass and as coating compositions.

When used as coating compositions they may be polymerized directly in solution and the solution thus formed applied to a surface. Pigments, fillers and coloring materials may be added before, during or after polymerization.

The polymers when pure are transparent, glass-clear products. They may be obtained directly in the form of sheets, blocks, rods, etc. by pouring the monomer into a suitable mold and heating it until polymerization is complete. In such cases it is preferable to heat under pressure or to add a terpene hydrocarbon to the monomer to prevent the formation of bubbles.

The polymeric materials in powder or other form may be molded under the influence of heat and pressure. The conditions of molding will vary considerably with the shape of the mold but usually a temperature up to about 150° C. and pressures up to one ton per square inch will be adequate. Higher and lower temperatures and pressures may be used depending on conditions. Plasticizers such as the ester of phthalic acid, camphor, acetones, etc. may be used to impart desired results. Mold lubricants such as mineral oils, neat's foot oil, stearic and oleic acids, etc. may also be employed either directly in the mold or incorporated in the polymer.

What I claim is:

1. A polymeric acrylic acid ester of an alcohol of the group consisting of the secondary and tertiary butyl and amyl alcohols.
2. Polymeric tertiary butyl acrylate.
3. Polymeric tertiary amyl acrylate.

HARRY T. NEHER.